(12) United States Patent  
Mraz et al.

(10) Patent No.: US 9,311,329 B2
(45) Date of Patent: Apr. 12, 2016

(54) SYSTEM AND METHOD FOR MODULAR AND CONTINUOUS DATA ASSURANCE

(71) Applicant: Owl Computing Technologies, Inc., Ridgefield, CT (US)

(72) Inventors: Ronald Mraz, South Salem, NY (US); Gabriel Silberman, Austin, TX (US)

(73) Assignee: Owl Computing Technologies, Inc., Ridgefield, CA (US)

( * ) Notice: Subject to any disclaimer, the term of this patent is extended or adjusted under 35 U.S.C. 154(b) by 93 days.

(21) Appl. No.: 14/296,736

(22) Filed: Jun. 5, 2014

(65) Prior Publication Data

US 2015/0358323 A1 Dec. 10, 2015

(51) Int. Cl.
*G06F 17/30* (2006.01)
*H04L 29/06* (2006.01)

(52) U.S. Cl.
CPC ........ *G06F 17/30203* (2013.01); *H04L 63/101* (2013.01); *H04L 63/123* (2013.01)

(58) Field of Classification Search
CPC ....... H04L 63/08; H04L 63/102; H04L 63/10; G06F 21/6218; H04W 12/06
USPC ........................................................... 726/4
See application file for complete search history.

(56) References Cited

U.S. PATENT DOCUMENTS

| | | | |
|---|---|---|---|
| 5,638,446 A | 6/1997 | Rubin | |
| 5,703,562 A | 12/1997 | Nilsen | |
| 5,745,679 A | 4/1998 | Mercer | |
| 5,995,982 A | 11/1999 | Mercer | |
| 6,151,708 A | 11/2000 | Pedrizetti et al. | |
| 6,381,742 B2 | 4/2002 | Forbes et al. | |
| 6,430,608 B1 | 8/2002 | Shaio | |
| 6,694,434 B1 | 2/2004 | McGee et al. | |
| 6,789,255 B1 | 9/2004 | Pedrizetti et al. | |

(Continued)

FOREIGN PATENT DOCUMENTS

| | | |
|---|---|---|
| EP | 20457520 A2 | 8/2009 |
| EP | 2430548 A1 | 11/2010 |

(Continued)

OTHER PUBLICATIONS

UK Intellectual Property Office, Combined Search and Examination Report under Sections 17 & 18(3), Dec. 23, 2013 (includes Search Report under Section 17 dated Dec. 20, 2013).

*Primary Examiner* — Baotran N To
(74) *Attorney, Agent, or Firm* — John S. Economou

(57) ABSTRACT

A system for assuring the integrity of information files includes a first server, a manifest transfer engine and a second server. The first server stores information files and an associated manifest file containing a manifest entry for each stored information file. The manifest transfer engine receives the manifest file and the information files from the first server on a predetermined basis. The manifest transfer engine compares an identifying characteristic of each received information file with the manifest entries in the manifest file and, when there is a match, transfers the associated information file on the output as an authenticated information file. The second server receives the authenticated information file from the manifest transfer engine, optionally segments the authenticated information file, and then generates an associated manifest entry for the received authenticated information file (or segmented information files) and stores the associated manifest entry (or entries) in an updated manifest file.

14 Claims, 6 Drawing Sheets

(56) References Cited

U.S. PATENT DOCUMENTS

| | | |
|---|---|---|
| 6,883,168 B1 | 4/2005 | James et al. |
| 6,944,634 B2 | 9/2005 | Hertling et al. |
| 6,970,866 B1 | 11/2005 | Pravetz et al. |
| 7,089,248 B1 | 8/2006 | King et al. |
| 7,092,972 B2 | 8/2006 | Kashyap |
| 7,263,528 B2 | 8/2007 | Haff et al. |
| 7,280,956 B2 | 10/2007 | Cross et al. |
| 7,310,629 B1 | 12/2007 | Mendelson et al. |
| 7,373,345 B2 | 5/2008 | Carpentier et al. |
| 7,386,574 B2 | 6/2008 | Abe et al. |
| 7,472,272 B2 | 12/2008 | Stamos et al. |
| 7,483,958 B1 | 1/2009 | Elabbady et al. |
| 7,502,754 B2 | 3/2009 | Campbell et al. |
| 7,558,797 B2 | 7/2009 | Li |
| 7,610,355 B2 | 10/2009 | Azuma et al. |
| 7,668,868 B1 | 2/2010 | King et al. |
| 7,707,424 B2 | 4/2010 | Axelsson |
| 7,756,826 B2 | 7/2010 | Bots et al. |
| 7,765,411 B2 | 7/2010 | Hennessey et al. |
| 7,805,468 B2 | 9/2010 | Takashi |
| 7,814,551 B2 | 10/2010 | Darweesh et al. |
| 7,865,575 B2 | 1/2011 | Leitheiser |
| 7,874,015 B2 | 1/2011 | Aaron |
| 7,930,538 B1 | 4/2011 | Israel et al. |
| 7,934,091 B2 | 4/2011 | Stamos et al. |
| 7,992,209 B1 | 8/2011 | Menoher et al. |
| 8,010,680 B2 | 8/2011 | Crawford |
| 8,024,306 B2 | 9/2011 | Palliyil et al. |
| 8,024,462 B1 | 9/2011 | Zhu et al. |
| 8,041,946 B2 | 10/2011 | Bunn et al. |
| 8,069,349 B1 | 11/2011 | Israel et al. |
| 8,075,403 B2 | 12/2011 | O'Brien et al. |
| 8,103,870 B2 | 1/2012 | Clower et al. |
| 8,161,104 B2 | 4/2012 | Tomkow |
| 8,176,331 B2 | 5/2012 | Moreillon et al. |
| 8,191,165 B2 | 5/2012 | Aaron |
| 8,196,201 B2 | 6/2012 | Repasi et al. |
| 8,234,350 B1 * | 7/2012 | Gu .............. H04N 21/234309 709/203 |
| 8,250,235 B2 | 8/2012 | Harvey et al. |
| 8,352,450 B1 | 1/2013 | Mraz et al. |
| 2004/0133548 A1 | 7/2004 | Fielding et al. |
| 2005/0066240 A1 | 3/2005 | Sykes et al. |
| 2005/0102308 A1 | 5/2005 | Sykes et al. |
| 2012/0030768 A1 | 2/2012 | Mraz et al. |

FOREIGN PATENT DOCUMENTS

| | | |
|---|---|---|
| WO | WO2010132647 A1 | 11/2010 |
| WO | WO2012012266 A1 | 1/2012 |

* cited by examiner

SYSTEM AND METHOD FOR MODULAR AND CONTINUOUS DATA ASSURANCE

FIELD

The present invention relates generally to a system and method for ensuring the integrity of data.

BACKGROUND

The risk for the compromise of data integrity increases over time, whether the data is being transmitted over a network or at rest in storage. This occurs because the data is exposed to network components (when in transit) or available for examination and modification (when stored). The risk of data being compromised may be tolerated to a certain extent, but unacceptable beyond a certain threshold or acceptable risk.

Protection of a computer or data network from undesired and unauthorized data disclosure, interception or alteration has been a perennial concern in the field of computer and network security. For example, firewall and anti-spyware software have been developed to address security concerns for computers and networks connected to the Internet and to protect them from possible cyber-attacks such as Trojan horse-type viruses or worms that may trigger undesired and unauthorized data disclosure by these computers and networks. However, for high security computer networks such as those used by government agencies and intelligence community and certain commercial applications, conventional network security devices such as firewalls may not provide sufficiently reliable protection from undesired data disclosure.

Alternative network security methods and devices based on unidirectional data transfer have been devised to address the network security concern. For example, U.S. Pat. No. 5,703,562 to Nilsen ("the '562 Patent"), which is hereby incorporated by reference in its entirety, provides an alternative way to address the network security concern. The '562 Patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

Any data link that strictly enforces the unidirectionality of data flow is called a one-way link or one-way data link. In other words, it is physically impossible to send information or data of any kind through a one-way data link in the reverse direction. A one-way data link may be hardware-based, software-based, or based on some combination of hardware and software.

One-way data transfer systems based on such one-way data links provide network security to data networks by isolating the networks from potential security breaches (i.e., undesired and unauthorized data flow out of the secure network) while still allowing them to import data from the external source in a controlled fashion. FIG. 1 schematically illustrates an example of one such one-way data transfer system 100. In the one-way data transfer system shown in FIG. 1, two computing platforms 101 and 102 (respectively, "the send platform" and "the receive platform") are connected to the unsecured external network 104 ("the source network") and the secure network 105 ("the destination network"), respectively. The send platform 101 is connected to the receive platform 102 by a one-way data link 103, which may be an optical link comprising, for example, a high-bandwidth optical fiber. This one-way optical data link 103 may be configured to operate as a unidirectional data gateway from the source network 104 to the secure destination network 105 by having its ends connected to an optical transmitter on the send platform and to an optical receiver on the receive platform.

A configuration such as the one shown in FIG. 1 physically enforces one-way data transfer at both ends of the optical fiber connecting the send platform 101 to the receive platform 102, thereby creating a truly unidirectional data transfer link between the source network 104 and the destination network 105. One-way data transfer systems based on a one-way data link are designed to transfer data or information in only one direction, making it physically impossible to transfer any kind of data, such as handshaking protocols, error messages, or busy signals, in the reverse direction. Such physically imposed unidirectionality in data flow cannot be hacked by a programmer, as is often done with firewalls, where unidirectional rules are software-protected (e.g., password authentication, etc.). Accordingly, the one-way data transfer system based on a one-way data link ensures that data residing on the isolated destination secure computer or network is maximally protected from any undesired and unauthorized disclosure. Alternatively, the source network is isolated from any malware contained in the destination network.

Software systems and applications, whether for direct use on a computer or embedded in other devices (e.g., firmware), often need to be installed and/or updated before initial use or periodically during the lifetime of such computer or device (i.e., to update to a new version or release). Such updates may add features, fix known problems and/or support the connection to or use of additional hardware and software components and systems. An initial software version or a software update (collectively a "payload" or "install payload") may be delivered by the software or device manufacturer (or its agent) via recorded physical digital media (e.g., CDs, DVDs, USB drives, hard drives, etc.) or by making it available on an online server for delivery to or retrieval by an end user of the software or device. In some cases, e.g., a surgically-implanted device having internal updatable software/firmware, the payload may only be loaded into the device at a physician's office or other secure healthcare facility via a specialized programming apparatus.

There are cases in which the install payload could be compromised as the result of malicious modifications to code residing either on a physical media or on an online server. In other scenarios, regulatory and/or security requirements may forbid the introduction of physical media into a facility where the systems requiring the install payload is needed, e.g., because of the secure nature of such facility. For these scenarios, connecting to any external network may also be forbidden because of the danger posed by information exfiltration and exposure to malware as discussed above.

As described in U.S. Pat. No. 8,352,450, issued on Jan. 8, 2013 which is incorporated herein by reference in its entirety ("the '450 Patent"), files based on various conventional transport protocols may be transferred across a one-way data link under suitable arrangements. The following example illustrates transfer of files based on the Transmission Control Protocol (TCP) across a one-way data link. FIG. 2 is a functional block diagram that schematically illustrates implementation of a TCP-based secure file transfer across a single one-way data link in a one-way data transfer system 200.

Construction of the conventional TCP sockets requires bilateral communications since it requires an acknowledgement channel from the receive node to the send node. Accordingly, the conventional TCP/IP protocol cannot be implemented directly in a one-way data transfer system based on a one-way data link, since no bilateral "hand shaking" is allowed over the one-way link due to physical enforcement of unidirectionality of data flow. Instead, the one-way data transfer system 200 illustrated in FIG. 2 uses a TCP simulation application called TCP proxy, which is preferably a TCP/IP socket-based proxy software, but may also be hardware-based or based on a suitable combination of software and hardware, to simulate the TCP/IP protocol across the one-way data link 207.

In FIG. 2, a TCP server proxy 205 fully implements the TCP/IP protocol in its bilateral communications 203 with the upstream TCP file client 202 residing in a source platform 201. The TCP server proxy 205 may reside within the send node 204 as shown in FIG. 2, or alternatively, may be separate from but coupled to the send node 204. After the TCP server proxy 205 receives files from the TCP file client 202, the send node 204 sends the files through its interface 206 to the one-way data link 207. After the receive node 208 receives the files through its interface 209 from the one-way data link 207, the TCP client proxy 210 communicates under the full implementation of the TCP/IP protocol with a TCP file server 213 residing in a destination platform 212 and forwards the received files to the TCP file server 213. The TCP client proxy 210 may reside within the receive node 208 as shown in FIG. 2, or alternatively, may be separate from but coupled to the receive node 208.

In certain situations, it would be advantageous to use a one-way data link with an independent link layer protocol for one-way transfer so that non-routable point to point communications with a true IP protocol break can be enforced. With these properties, data packets or files cannot be accidentally routed in the network and other protocols (such as printer protocols, etc.) will not route across the one-way data link. An exemplary configuration enforcing such non-routable point to point communications with a true IP protocol break can be implemented in the one-way file transfer system 200 of FIG. 2. The TCP-based file transfer system 200 may be configured to prohibit transmission of IP information across the one-way data link 207. When the TCP server proxy 205 receives a file from the TCP file client 202, it removes the IP information normally carried in the file data packet headers under the TCP/IP protocol and replaces it with pre-assigned point-to-point channel numbers, so that no IP information is sent across the one-way data link 207. Instead, predetermined IP routes may be defined at the time of the configuration of the system 200 in the form of channel mapping tables residing in the TCP server proxy 205 associated with the send node 204 and the TCP client proxy 210 associated with the receive node 208. The send node 204 then sends the files with the pre-assigned channel numbers to the receive node 208 through its interface 206 across the one-way data link 207, which are received by the receive node 208 through its interface 209. Upon receipt of the files, the TCP client proxy 210 then maps the channel numbers from the received files to the corresponding predetermined IP address of a destination platform 212, to which the files are forwarded.

For the security of the overall one-way file transfer system 200, the IP address-to-channel number mapping table residing in the send node 204 may be different from the channel number-to-IP address mapping table residing in the receive node 208, and furthermore, neither table may be re-constructed on the basis of the other table. Neither table alone reveals the overall IP routing configuration from the source platform 201 to the destination platform 212. In this way, the IP information of the destination platform 212 may remain undisclosed to the sender at the source platform 201 and the security of the overall system 200 can be maintained.

Under the conventional TCP/IP protocol, the acknowledgement mechanism requiring bilateral communications may provide means for error detection. However, the one-way data link 207 forecloses such means. Instead, the one-way data transfer system 200 may assure file integrity by applying, for example, a hash algorithm such as MD5 to each file being transferred over the one-way data link 207. The send node 204 calculates an MD5 hash number for the file and sends the resulting hash number along with the file to the receive node 208 over the one-way data link 207. When the receive node 208 receives the file, it may re-calculate a hash number for the received file and compare the result with the hash number calculated by the send node 204. By comparing these results, the receive node 208 may be able to determine as to whether any error has occurred during the file transfer across the one-way data link.

As described in U.S. patent application Ser. No. 13/748, 045, filed on Jan. 23, 2013, ("the '045 Application," published as U.S. Patent Publication No. 2014/0020109 A1 on Jan. 16, 2014), which is incorporated herein by reference in its entirety, a manifest transfer engine 300 may operate as a file filtering device for securing one-way transfer of files.

As shown in FIG. 3A, the manifest transfer engine 300 comprises a send side 301, a receive side 303, and a one-way data link 302 enforcing unidirectional data flow from the send side 301 to the receive side 303. The send side 301 of the manifest transfer engine 300 is configured to receive a file manifest table 304 from the system administrator (e.g., administrator server 306 shown in FIG. 3A) and store it. The send side 301 is also configured to receive files 305 to be transferred across the one-way data link 302 from the user. The send side 301 of the manifest transfer engine 300 performs the file manifest filtering by comparing the received files 305 against the file manifest table 304 received from the administrator. Only upon validation based on the file manifest table 304 stored in the send side 301, the files 305 from the user are allowed to be transferred to the receive side 303 of the manifest transfer engine 300 via one-way data link 302.

The send side 301 of the manifest transfer engine 300 may comprise a file client configured to receive files 305 from the user and send them across the one-way data link 302 upon validation. Similarly, the receive side 303 of the manifest transfer engine 300 may comprise a file server configured to receive the files from the one-way data link 302 and forward the received file (i.e., as an authenticated file 307) to the intended recipient (e.g., a file server in the destination network). The send side 301 and the receive side 303 of the manifest transfer engine 300 may respectively comprise a TCP file client 202 and a TCP file server 213 shown in FIG. 2, which are respectively configured to transfer and receive files across one-way data link 207 via specifically configured TCP server and client proxies 205, 210. In this case, upon validation of the file 305 based on the file manifest table 304, the manifest transfer engine 300 may operate in the same or similar manner as the TCP-based file transfer system 200 of FIG. 2 to transfer the file across the one-way data link 302.

The file manifest table 304 may be created in the form of an ASCII-only text file containing hash numbers or other forms of identification corresponding to the files that are permitted to be transferred through one-way data link 302. For example, a manifest file may be assembled by the administrator based on the hash numbers provided by the user that correspond to the files that the user wishes to transfer across the network boundary via one-way data link 302. In another example, a manifest file may be assembled by the administrator based on the hash numbers of anti-virus and anti-malware updates and/or OS and software patches that are made publicly available from software companies.

The manifest transfer engine 300 may perform file manifest filtering as follows: The executable or non-executable file 305 received from the user by the send side 301 of the manifest transfer engine 300 is individually validated against the file manifest table 304 stored in the send side 301. In one or more embodiments, the send side 301 calculates a hash number for the received file 305 and compares it with the registered hash numbers listed on the file manifest table 304. If there is a match, the file 305 is validated and the send side 301 allows it to be transferred to the receive side 303 via one-way data link 302. On the other hand, if no match is found, the file 305 is denied transfer across one-way data link 302 and may be quarantined or deleted by the send side 301 or by the administrator. The incident of finding no match may be logged.

FIG. 3B illustrates an alternative exemplary embodiment of the manifest transfer engine 310. The send side 311 of the manifest transfer engine 310 is configured to receive a file 315 from the user and send it to the receive side 313 via a one-way data link 312. Unlike the manifest transfer engine 300 of FIG. 3A in which the send side 301 is configured to receive and store a file manifest table 304 from admin server 306 and perform the file manifest filtering, in the manifest transfer engine 310 of FIG. 3B, the receive side 313 is configured to receive and store a file manifest table 314 from admin server 316 and to perform the file manifest filtering by comparing the file 315 received from the one-way data link 312 against the file manifest table 314. As a further variation, the file manifest table 314 may also be provided via the one-way data link 312 instead of via a separate connection. In this case, the file manifest table 314 must be properly tagged to allow the receive side 313 to distinguish it from file 315. Only upon validation based on the file manifest table 314 stored in the receive side 313, the file 315 from the user is allowed to be released and forwarded as an authenticated file 317 to the destination. If the file fails validation based on the file manifest table 314, the receive side 313 does not release the file and may delete or quarantine the file. Except for the above described differences, other aspects of the file manifest filtering by the manifest transfer engine 310 of FIG. 3B may be same or substantially similar to those of the manifest transfer engine 300 of FIG. 3A.

The manifest transfer engines 300, 310 disclosed in the '045 Application provide a way to authenticate files being transferred from a source to a destination. However, the prior art does not address how to deal with information files which have become stale—i.e., unchanged for a period of time after creation of the file and associated manifest entry, and possibly altered.

The present invention provides a system and method for data transfer/data assurance which overcome the problems with the prior art. Other advantages of the present invention will become apparent from the following description.

SUMMARY

The present invention is directed to a system and method to mitigate the risk of data integrity being compromised by alterations and/or introduction of malware. Given a trusted point or component in a system where data is in transit or stored, this method provides the capability to continuously assure data remains uncompromised. Furthermore, the same level of assurance can be made available at several levels of granularity, from individual data records (e.g., messages, frames, or images) to entire collections of data (e.g., files, databases or data streams).

The present invention is directed to a system for assuring the integrity of information files, comprising a first server, a manifest transfer engine and a second server.

In a first embodiment, the first server has a storage memory for storing information files and an associated manifest file. The associated manifest file contains a manifest entry for each of the stored information files. The first server is configured to provide the information files and the associated manifest file on an output. The manifest transfer engine has an input coupled to the output of the first server and is configured to receive the manifest file and at least one of the information files from the first server. In addition, the manifest transfer engine has an output and is further configured to compare an identifying characteristic of each received information file with the manifest entries in the manifest file and, only if there is a match between the identifying characteristic and a manifest entry in the manifest file, transfer the associated at least one information file on the output as an authenticated information file. The second server is configured to receive the authenticated information file from the manifest transfer engine, to generate an associated manifest entry for the received authenticated information file and to store the associated manifest entry in an updated manifest file. The second server preferably includes an output and is configured to output the authenticated information file and the updated manifest file on the output.

The first embodiment may preferably include a third server having an input coupled to the output of the second server. The third server may be configured to receive the authenticated information file and the updated manifest file and to store the authenticated information file and the updated manifest file in a memory. In a further embodiment, the output of the third server may be coupled to an input of the first server, with the first server configured to receive the authenticated information file and the updated manifest file, to replace an associated information file with the corresponding authenticated information file and to replace the manifest file with the updated manifest file.

In a further embodiment, the first server may be configured to periodically provide the information files and the manifest file sequentially on the output. Further, the output of the first server may have a first portion and a separate second portion, with the first server configured to periodically provide the information files on the first portion of the output and to periodically provide the manifest file sequentially on the second portion of the output.

Preferably, each manifest entry for each of the stored information files in the manifest file stored in the first server may preferably be generated based upon a first criteria and the second server may generate the associated manifest entry for the received authenticated information file based on a second criteria that is different from the first criteria.

In a second embodiment, the first server has a storage memory for storing information files and an associated manifest file containing a manifest entry for each of the stored information files. The manifest transfer engine has an input coupled to the first server and is configured to receive the manifest file and at least one of the information files from the first server. In addition, the manifest transfer engine has an output and is further configured to compare an identifying characteristic of each received information file with the manifest entries in the manifest file and, only if there is a match between the identifying characteristic and a manifest entry in the manifest file, transfer the associated at least one information file on the output as an authenticated information file. The second server is configured to receive the authenticated information file from the manifest transfer engine and to segment each authenticated information file into a plurality of segmented authenticated information files based upon a pre-determined criteria. The second server is further configured to generate an associated manifest entry for the segmented authenticated information files and store the associated manifest entry in an updated manifest file stored in the memory. The second server preferably includes an output and is configured to output the segmented authenticated information files and the updated manifest file on the output.

The second embodiment may include a third server having an input coupled to the output of the second server. The third server may be configured to receive the segmented authenticated information files and the updated manifest file and to store the segmented authenticated information files and the updated manifest file in a memory. In a further embodiment, the output of the third server may be coupled to an input of the first server. The first server may be configured to receive the segmented authenticated information files and the updated manifest file, to replace each associated information file with the corresponding segmented authenticated information files and to replace the manifest file with the updated manifest file.

In a further embodiment, the first server may be configured to periodically provide the information files and the associated manifest file sequentially on the output. The output of the first server may have a first portion and a separate second portion. The first server may be configured to periodically provide the information files on the first portion of the output and to periodically provide the manifest file sequentially on the second portion of the output.

BRIEF DESCRIPTION OF THE DRAWINGS

The above and related objects, features and advantages of the present invention will be more fully understood by reference to the following, detailed description of the preferred, albeit illustrative and exemplary, embodiments of the present invention when taken in conjunction with the accompanying figures, wherein.

DETAILED DESCRIPTION OF THE EXEMPLARY EMBODIMENTS

In the present disclosure, like reference numbers refer to like elements throughout the drawings, which illustrate various exemplary embodiments of the presently disclosed system. Although the presently disclosed system will be discussed with reference to various illustrated examples, these examples should not be read to limit the broader spirit and scope of the present invention.

Figure 1:
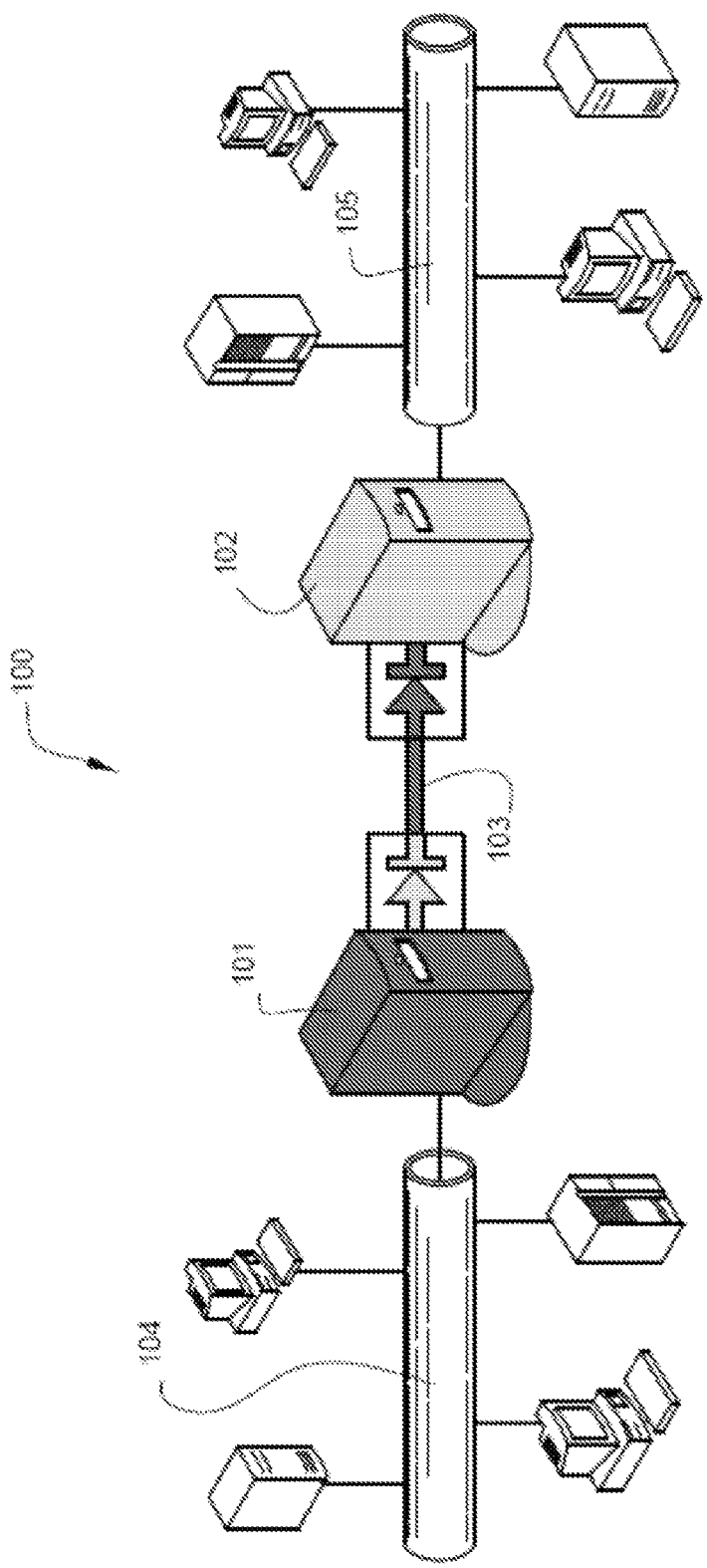
FIG. 1 schematically illustrates an example of a secure one-way data transfer system using a one-way data link.
Figure 2:
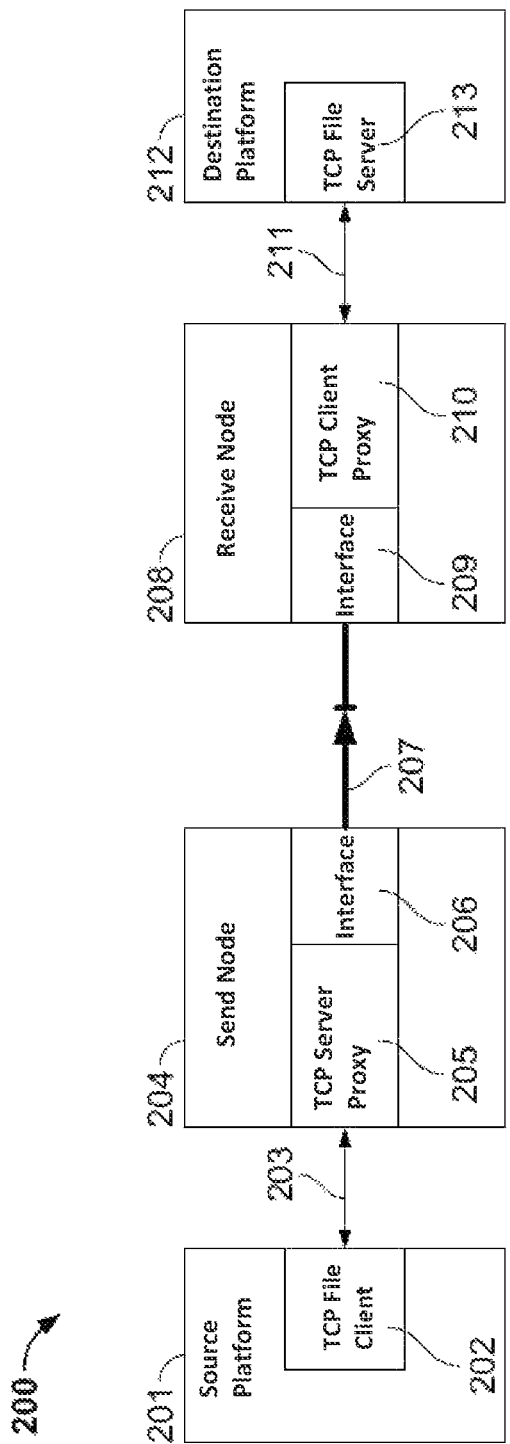
FIG. 2 is a functional block diagram that schematically illustrates TCP-based file transfer across a one-way data link.
Figure 3A:
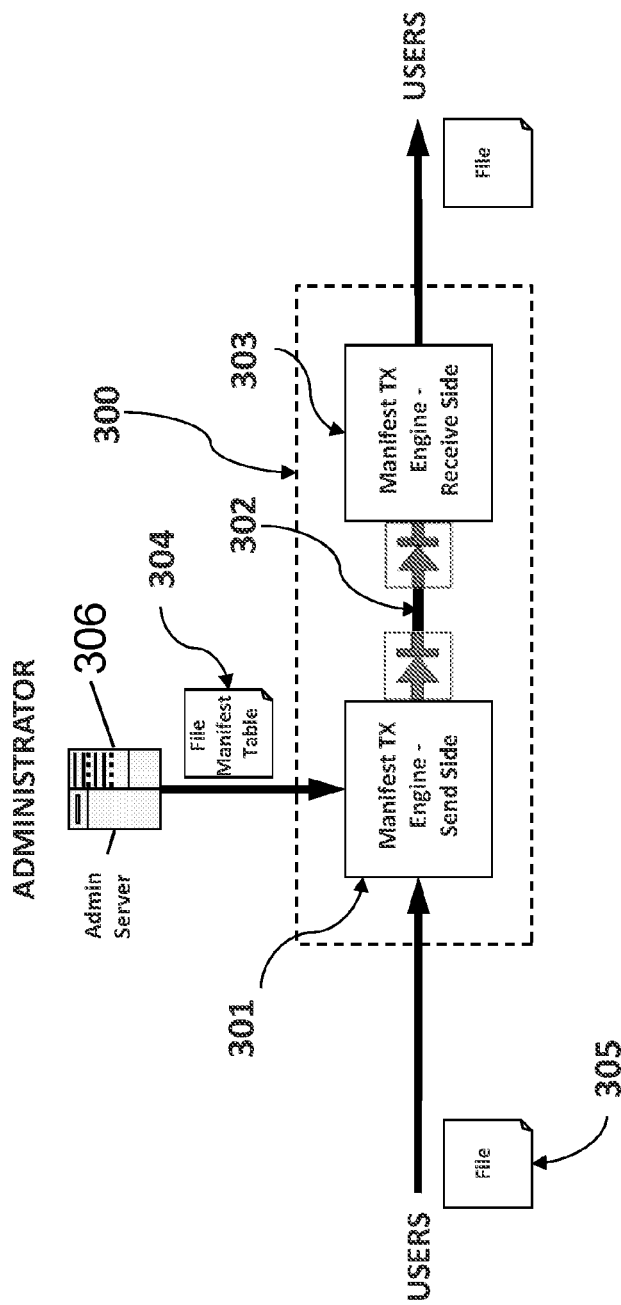
FIGS. 3A and 3B are block diagrams of a manifest transfer engine.
Figure 3B:
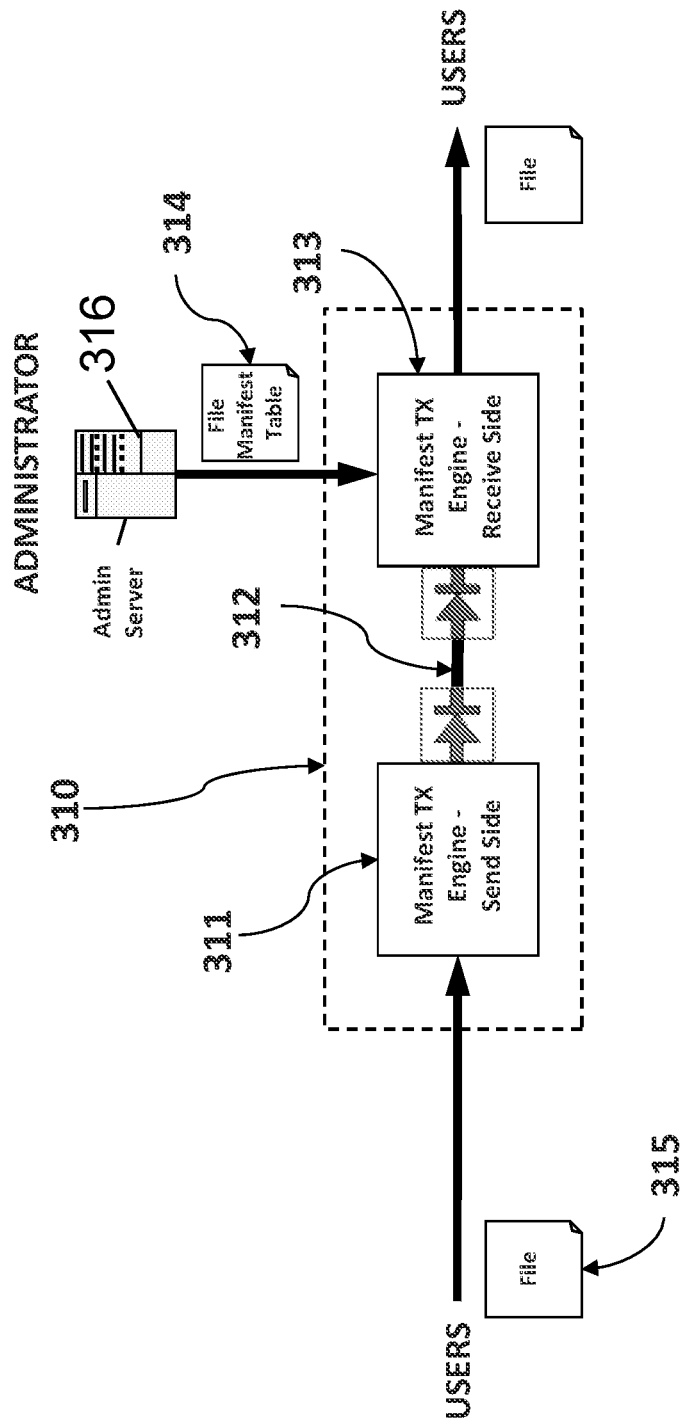
Figure 4:
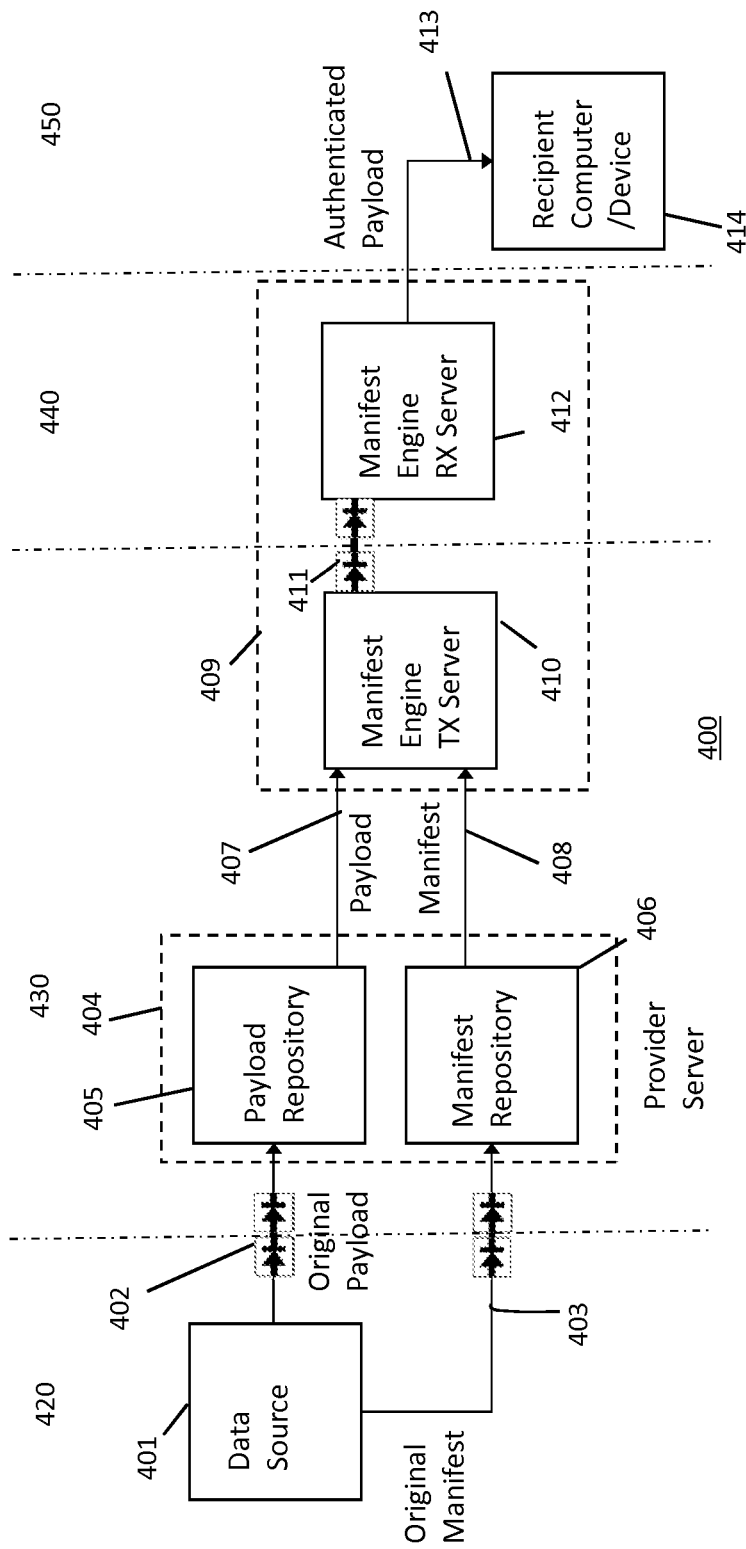
FIG. 4 is a block diagram of a first exemplary embodiment of the present invention.

In the present disclosure, a trusted point for the data is the data source 401 in FIG. 4. The data source may be any type of system which creates data, for example, a camera, a sensor, a heart monitor, a database, a designated file directory, an update file directory, etc. FIG. 4 shows four separate trustworthiness enclaves, starting with the trusted enclave 420 where the data is produced and where, in the preferred embodiment, its associated manifest entry is also produced. Trustworthiness enclaves do not map directly into security levels, but rather focus on the trustworthiness of a payload's integrity as a function of its distance (in location and time) from either its origin or the last time its integrity was affirmed (or reaffirmed). The next enclave 430 features a decaying trust level (over time), which sends data to the exposed enclave 440, which is connected to a recipient device 414, which may be in a suspect enclave 450. In the preferred embodiment, a "unit" of payload data is created by, for example, collecting a pre-determined number of transactions, all transactions within a specific length of time has elapsed, or all transactions up to the completion of a predefined task. For the purposes of this disclosure, the term "transaction" should be interpreted broadly as the creation or update of a data file. The unit of payload data (or payload) is sent from data source 401 to a payload repository 405 and either the manifest entry or the payload is sent to a manifest repository 406. Payload repository 405 simply stores the unit of payload data, while the manifest repository 406 stores a corresponding manifest entry for the unit of payload data, maintaining the linkage between the unit of payload data and the corresponding manifest entry. As one of ordinary skill in the art will readily recognize, the manifest entry can be created at the data source 401 and transmitted to the manifest repository, or the manifest entry can be created by the provider server 404 hosting payload repository 405 and manifest repository 406. As discussed herein, a manifest entry is a collection of information, such as cryptographic checksums, file name, type and length, time of creation, specific format, nature of content (e.g., printable ASCII text, valid image format), and asserting the presence of given strings or patterns, such as signatures or certificates. A manifest (or manifest file) is a collection of manifest entries. As described below, each payload is checked against the relevant information in a manifest to assure the integrity of the payload (i.e., to ensure that the payload has not been altered in any way).

The payload repository 405 and manifest repository 406 may be hosted on the same server 404 as shown in FIG. 4, or may be hosted in physically distinct servers. In the latter case, each repository 405, 406 may be placed in different security enclaves, thereby complicating the undertaking of a would-be attacker. Also, to protect the integrity of the data source 401, one-way data links 402, 403 may optionally be placed in the two data paths connecting data source 401 to the provider server 404. As one of ordinary skill in the art may readily recognize, in a further embodiment the data paths for the unit of payload data and the manifest may share one physical connection but use separate ports.

Preferably, to assure the integrity of the data, the manifest entry is created where the payload originates (i.e., at data source 401) and is sent to manifest repository 406 to be added to the current manifest. However, in some circumstances, the accumulation of data to form the payload at the data source 401 may not be practical. In such cases, data may be streamed or delivered in segments to payload repository 404. As mentioned above, the creation of the corresponding manifest entry is then performed at provider server 404 and stored in manifest repository 406 as part of the current manifest. Additional measures should be taken in this latter case to ensure the integrity of the data transfer and delivery from data source 401 to the payload repository 405 to maintain data integrity until the corresponding manifest entry is created. Unless data source 401 is located in the same trustworthiness enclave as provider server 404, the integrity assurance may degrade somewhat in this latter case.

In a static assurance implementation, units of payload data flow from the provider server 404 through a manifest transfer engine 409 under the control of a corresponding manifest entry, and only authenticated payloads pass to a recipient computer/device 414. The manifest transfer engine 409 uses a manifest (or manifest table), made up of manifest entries, to enable or block payloads from crossing a one-way data link. In particular, manifest transfer engine 409 includes a manifest engine TX server 410 coupled to a manifest engine RX server 412 via a one-way data link 411. In operation, manifest repository 406 is configured to either push the current manifest to manifest engine TX server 410, either periodically or whenever the manifest is updated. In the alternative, manifest engine TX server 410 may be configured to periodically request an updated manifest from manifest repository 406. Manifest engine TX server 410 receives payloads from payload repository 405, and compares the payload to the current manifest (as described in the '045 Application), and only passes a received payload to the manifest engine RX server 412 (via one-way data link 411) if there is a comparable entry in the manifest for the received payload. In turn, manifest engine RX server 412 passes the received payload to the recipient computer/device 414 via a communications link 413. The manifest entry for a payload stays constant, whether it corresponds to a whole unit of payload data or portions thereof. Although assurances about the integrity of the original payload may be high, such assurances decay over time. To continuously maintain a high level of assurance and to add flexibility to transfer different size portions of a payload, a manifest renewal and segmentation server 523 (FIG. 5) may be added to system 400 shown in FIG. 4.

Figure 5:
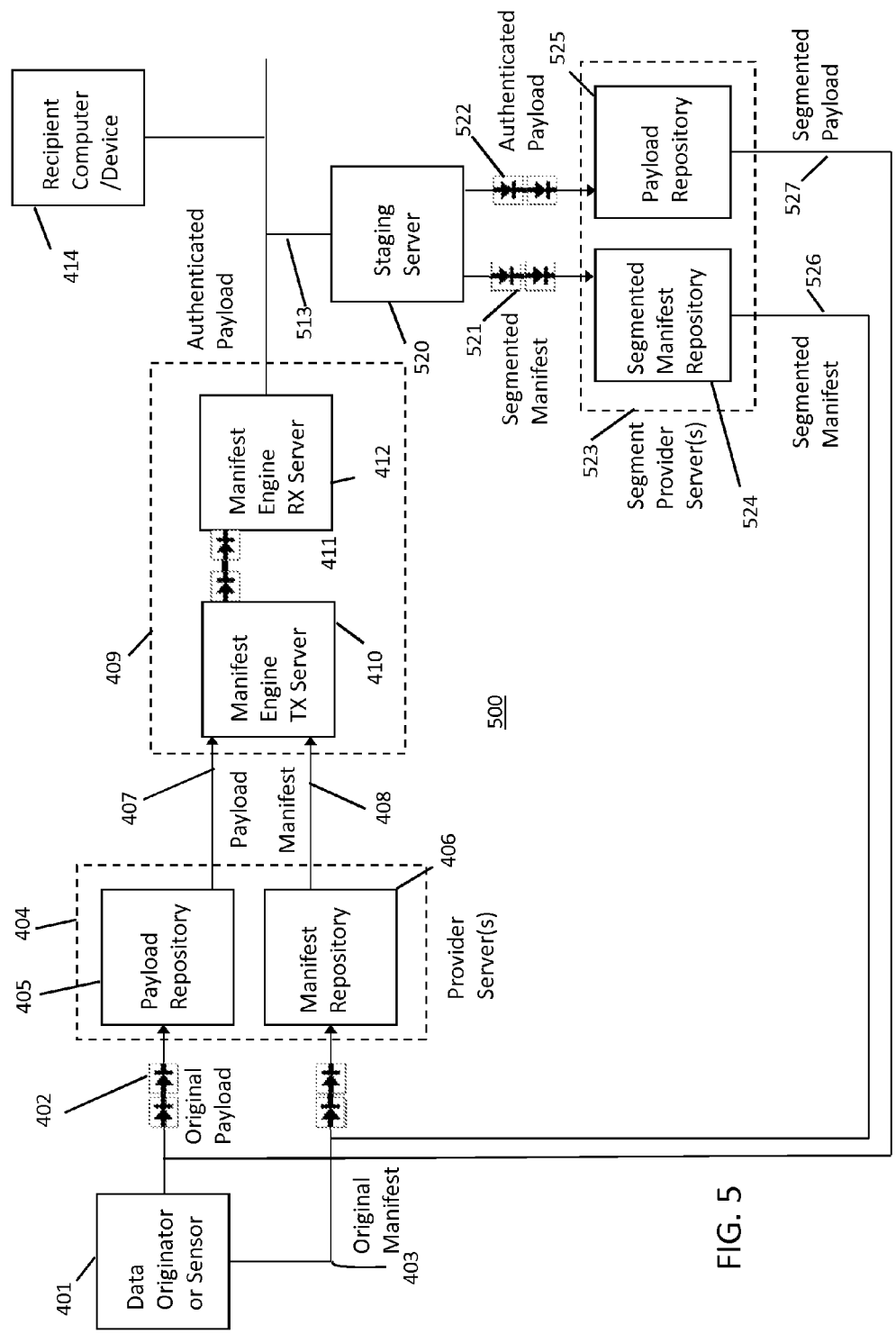
FIG. 5 is a block diagram of a second exemplary embodiment of the present invention.

In particular, referring now to FIG. 5, system 500 adds a staging server 520 and a manifest renewal and segmentation server 523 to the system 400 shown in FIG. 4. System 500 is used to verify and optionally segment the payloads stored in payload repository 405 as discussed herein. Staging server 520 is coupled to a communications link 513 (which is preferably a network link) One or more recipient computers/devices 414 are typically coupled to communication link 513, as shown in FIG. 5, and the payload data stored on staging server 520 is available to the one or more recipient computers/devices 414 via link 513. Staging server 520 provides two outputs, a staged payload via one-way data link 522 and a staged manifest via one-way data link 521. One-way data link 521 is coupled to a staged manifest repository 524, while one-way data link 522 is coupled to a staged payload repository 525. Both a staged manifest repository 524 and staged payload repository 525 are located on manifest renewal and segmentation server 523. Staged manifest repository 524 and staged payload repository 525 each have a single output, that is preferably looped back to the input of the manifest repository 406 and the payload repository 405, respectively. The function of the staging server 520 and the manifest renewal and segmentation server 523 is now described in conjunction with the operation of the complete system 500. In particular, once an original manifest entry is created for a given payload (and added to the current manifest) and the current manifest and the latest received payload are both resident in provider server 404, a process may be triggered periodically to continuously maintain a high level of assurance about the integrity of the payloads. The periodic frequency is determined by a time t which corresponds to a desired acceptable risk threshold—e.g., the amount of time in which it is unlikely that the payload has been altered.

The process starts by transferring the current manifest to manifest transfer engine 409. Next, all of the payloads in payload repository 403 (or a selected subset thereof) are transferred through the manifest transfer engine 409 to the staging server 520. If any of the payloads has been modified after generation of its corresponding manifest entry, it will not be sent across the manifest transfer engine 409 and may either be deleted or quarantined for later inspection. If a payload has not been modified, manifest transfer engine 409 transfers it to the staging server 520 for further processing.

The staging server 520 then may manipulate each payload (e.g., rename it, change its encryption algorithm or key, change its signature, etc.) and create a corresponding (new) manifest entry for that payload. Staging server 520 may also segment a particular payload into portions (a number of segmented files that together make up the entire file) and create manifest entries for each created portion (each segmented file) to enable partial transfer of a payload for boosting performance of certain applications (e.g., remote mounting/access to file segments via a network file system). In an embodiment, the portion file size is predetermined. To reassure the integrity of the payload, the recreated manifest entry may differ from the original one by a time stamp, a sequence number, or other identifying designation, or by specifying a different property to check a payload against. For example, the recreated manifest entry may include the time and date it was created, and payloads may be considered valid only for a given period, say a day from when the manifest was recreated. Another option is to switch the hash function used as the criterion for accepting a payload, or the key or algorithm used to encrypt it. This prevents a would-be attacker from zeroing in their efforts, over an extended period of time, on a specific criterion or encryption (key or method) to compromise the payload, since these vary over time. As one of ordinary skill in the art will readily recognize, staging server 520 may be incorporated into the manifest engine RX server 412, for a less complex implementation.

The new version of the payload (the staged payload) and its corresponding manifest (the staged manifest) are then transferred to the manifest renewal and segmentation server 523 (staged payload repository 525 and staged manifest repository 524, respectively). Manifest renewal and segmentation server 523 may be implemented as a single server, and/or be functionally the same as the provider server 404 which held the original payload and its manifest entry. The transfer may be done over one-way data links 521, 522 to offer additional protection to the staging server 520, which holds algorithms and other information to allow for encryption and other transformations required for updating of the manifest entries. If so implemented, the staging server 520 (or the manifest engine RX server/staging server combination) exists in its own trustworthiness enclave, separated by the one-way data link 411 at the input and the one-way data links 521, 522 at the output (when there are no other devices coupled to communication link 513 or when it is eliminated completely in the case of the manifest engine RX server/staging server combination).

The staged payload is available for use by an application, either directly via link 527, or preferably by another pass though the manifest transfer engine 409, which yields an up-to-date authenticated payload. In this latter case, the outputs 526, 527 of manifest renewal and segmentation server 523 are looped back to the inputs of provider server 404 (e.g., via one-way data links 403, 402, respectively). File segments may be of fixed or variable size, and the number of segments created can range from one (the full original payload) to many. A fixed segment size for each staged payload may be beneficial because it greatly simplifies the location of a particular data block or item. In an alternative embodiment, one-way data links 521, 522 may connect directly to respective data links 526, 527 and the manifest renewal and segmentation server 523 may be omitted.

The preceding illustrates an application of one-way data links, and particularly their use in a manifest transfer engine, to continuously assure the integrity of data based on a trusted origin. Besides its obvious applicability to newly generated data, the system and method described in this document may also be applied to existing data collections, if their integrity can be assessed or asserted prior to a first pass through the system. In addition to its integrity assurance properties, the system and method disclosed herein supports access to payload segments with the same assurance level as when the full payload is available for examination. This functionality is useful when transferring the full payload may be too costly (in time and/or space) or not feasible.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A system for assuring the integrity of information files, comprising:
    a first server having a storage memory for storing information files and an associated manifest file containing a manifest entry for each of the stored information files, the first server configured to provide the information files and the associated manifest file on an output;
    a manifest transfer engine having an input coupled to the output of the first server and configured to receive the manifest file and at least one of the information files from the first server, the manifest transfer engine having an output and further configured to compare an identifying characteristic of each received information file with the manifest entries in the manifest file and, only if there is a match between the identifying characteristic and a manifest entry in the manifest file, transfer the associated at least one information file on the output as an authenticated information file; and
    a second server configured to receive the authenticated information file from the manifest transfer engine, to generate an associated manifest entry for the received authenticated information file based on an identifying characteristic thereof and to store the associated manifest entry in an updated manifest file.

2. The system of claim 1, wherein the second server includes an output and is configured to output the authenticated information file and the updated manifest file on the output.

3. The system of claim 2, further comprising a third server having an input coupled to the output of the second server, and wherein the third server is configured to receive the authenticated information file and the updated manifest file and to store the authenticated information file and the updated manifest file in a memory.

4. The system of claim 3, wherein the output of the third server is coupled to an input of the first server, and wherein the first server is configured to receive the authenticated information file and the updated manifest file, to replace an associated information file with the corresponding authenticated information file and to replace the manifest file with the updated manifest file.

5. The system of claim 1, wherein the first server is configured to periodically provide the information files and the manifest file sequentially on the output.

6. The system of claim 5, wherein the output of the first server has a first portion and a separate second portion, and wherein the first server is configured to periodically provide the information files on the first portion of the output and to periodically provide the manifest file sequentially on the second portion of the output.

7. The system of claim 1, wherein each manifest entry for each of the stored information files in the manifest file stored in the first server is generated based upon a first criteria, and wherein the second server generates the associated manifest entry for the received authenticated information file based on a second criteria that is different from the first criteria.

8. A system for assuring the integrity of information files, comprising:
    a first server having a storage memory for storing information files and an associated manifest file containing a manifest entry for each of the stored information files;
    a manifest transfer engine having an input coupled to the first server and configured to receive the manifest file and at least one of the information files from the first server, the manifest transfer engine having an output and further configured to compare an identifying characteristic of each received information file with the manifest entries in the manifest file and, only if there is a match between the identifying characteristic and a manifest entry in the manifest file, transfer the associated at least one information file on the output as an authenticated information file; and
    a second server configured to receive the authenticated information file from the manifest transfer engine and to segment each authenticated information file into a plurality of segmented authenticated information files based upon a predetermined criteria, the second server still further configured to generate an associated manifest entry for the segmented authenticated information files based on an identifying characteristic thereof and store the associated manifest entry in an updated manifest file stored in the memory.

9. The system of claim 8, wherein the second server includes an output and is configured to output the segmented authenticated information files and the updated manifest file on the output.

10. The system of claim 9, further comprising a third server having an input coupled to the output of the second server, and wherein the third server is configured to receive the segmented authenticated information files and the updated manifest file and to store the segmented authenticated information files and the updated manifest file in a memory.

11. The system of claim 10, wherein the output of the third server is coupled to an input of the first server, and wherein the first server is configured to receive the segmented authenticated information files and the updated manifest file, to replace each associated information file with the corresponding segmented authenticated information files and to replace the manifest file with the updated manifest file.

12. The system of claim 8, wherein the first server is configured to periodically provide the information files and the associated manifest file sequentially on the output.

13. The system of claim 12, wherein the output of the first server has a first portion and a separate second portion, and wherein the first server is configured to periodically provide the information files on the first portion of the output and to periodically provide the manifest file sequentially on the second portion of the output.

14. The system of claim 8, wherein each manifest entry for each of the stored information files in the manifest file stored in the first server is generated based upon a first criteria, and wherein the second server generates the associated manifest entry for the received segmented authenticated information files based on a second criteria that is different from the first criteria.

\* \* \* \* \*